United States Patent
Fan et al.

(10) Patent No.: US 6,559,260 B1
(45) Date of Patent: May 6, 2003

(54) ALLYL URETHANE RESIN COMPOSITIONS

(75) Inventors: Mingxin Fan, West Chester; Gary W. Ceska, Exton; James Horgan, West Chester, all of PA (US)

(73) Assignee: Sartomer Technology Company, Inc., Wilmington, DE (US)

( * ) Notice: Subject to any disclaimer, the term of this patent is extended or adjusted under 35 U.S.C. 154(b) by 0 days.

(21) Appl. No.: 09/535,176

(22) Filed: Mar. 27, 2000

(51) Int. Cl.$^7$ .................. C08L 75/16; C08L 75/14; C08G 18/67; C08J 3/28
(52) U.S. Cl. ............... 526/301; 522/90; 522/95; 522/174; 525/123; 525/127; 525/330.5; 525/452; 528/49; 528/75; 560/25; 560/26; 560/115; 560/158
(58) Field of Search ............... 522/90, 95, 174; 525/123, 127, 330.5, 452; 528/49, 75; 526/301; 560/25, 26, 115, 158

(56) References Cited

U.S. PATENT DOCUMENTS

| | | | |
|---|---|---|---|
| 2,926,148 A | 2/1960 | Leclercq et al. ........... 528/74.5 |
| 3,615,450 A | 10/1971 | Werber et al. ............... 430/306 |
| 3,779,995 A | 12/1973 | Dannels et al. .......... 428/423.1 |
| 4,002,798 A | 1/1977 | Morgan ...................... 428/419 |
| 4,005,041 A | * 1/1977 | Piggott ........................ 528/75 |
| 4,031,271 A | * 6/1977 | Bush ....................... 430/277.1 |
| 4,433,179 A | * 2/1984 | Lohse et al. ................. 568/664 |
| 4,614,761 A | * 9/1986 | Takiyama et al. ............. 525/59 |
| 4,829,123 A | * 5/1989 | Shigematsu et al. .......... 525/28 |
| 5,198,528 A | * 3/1993 | Smith et al. ................. 528/272 |
| 5,236,978 A | * 8/1993 | Selvig et al. .................. 524/81 |
| 5,610,252 A | * 3/1997 | Bambury et al. ............ 526/279 |
| 5,739,251 A | * 4/1998 | Venham et al. ............... 528/49 |
| 5,763,099 A | * 6/1998 | Misev et al. ................. 428/482 |

* cited by examiner

Primary Examiner—Rabon Sergent
(74) Attorney, Agent, or Firm—Michael B. Fein, Esq.; Cozen O'Connor

(57) ABSTRACT

The present invention is for a new class of allyl urethane resin which can be cured with peroxide at high temperature alone or in combination with some accelerators. These allyl urethane resins can be sued alone or in combination with other free radically polymerizable materials such as allyl monomers and ligomers or (meth)acrylate monomers and oligomers. These new allyl urethane resins contain at least two allyl functional groups.

8 Claims, No Drawings

ALLYL URETHANE RESIN COMPOSITIONS

This invention relates to novel isocyanate based allyl ether derivatives which may be cured using free radical initiators.

Various polyurethane resins are well known for their coating and protective properties. Differing urethanes have different properties depending on the particular organic compounds used to form the urethanes. Similarly, the method of cross linking in the urethane resin to form a cured product will vary with the starting materials for the urethanes.

For instance, U.S. Pat. No. 4,005,041 discloses polyurethane coating compositions with air drying, and or heat curable properties. The urethanes have allyl functionality and are polymers with aliphatic polyols as backbones. The urethanes are high in viscosity and relatively low in allyl functional groups, with air drying properties.

U.S. Pat. No. 4,829,123 relates to an air dryable resin composition. The composition contains one radical-curable resin which may be an unsaturated polyester resin or an acrylic based resin (urethane-acrylic, polyester-acrylic or epoxy-acrylic) along with a urethane-acrylic oligomer, an ethylenically unsaturated monomer, and an initiator.

U.S. Pat. No. 5,763,099 relates to a binder composition for powder coatings. The low temperature-cure binder is a mixture of unsaturated polyester and an oligomer with 2–12 allyl ether groups having ester or urethane groups included. Preferably, the oligomer is an ester of trimethololpropanediallylether and polycarboxylic acid (or anhydride).

U.S. Pat. No. 5,739,251 to Venhan pertains to ethylenically unsaturated polyisocyanates which contain allophanate groups and have specific weight contents of isocyanate, β, γ-ethylenically unsaturated ether groups, and allophanate groups. The polyisocyanates are intended to be low viscosity materials for use in solvent-free, one-component coating compositions. The polyisocyanate is then used to make an ethylenically unsaturated polyurethane which is substantially free from isocyanate groups. This polyurethane is then combined with an acrylate material such as trimethololpropanetriacrylate to produce a coating.

U.S. Pat. No. 4,005,041 pertains to a method for producing isocyanate adducts. The adducts contain residual isocyanate groups. The adducts are polyurethane coating compositions with air drying and/or heat curable properties. The adducts contain allyl functional groups and have aliphatic polyols as backbones. They are generally high in viscosity and low in allyl functional groups.

U.S. Pat. No. 5,198,528 to Smith, et al. pertains to an alkane resin which is the polymerized product of trimethololpropanediallylether, an aromatic acid, a drying compound, and a polyol. The resin is generally used with a solvent such as mineral spirits. Absent the mineral spirits, the resin has a high viscosity. Therefore it must be thinned with an appropriate solvent prior to use.

U.S. Pat. No. 4,031,271 pertains to a radiation curable, alkali resistant composition of a polyene and polythiol. The alkali resistance allows the cured Composition to be used as a plating resist in the manufacture of electronic circuitry.

U.S. Pat. No. 4,433,1739 pertains to a process for the preparation of allyl ethers. The allyl ethers are usable as monomers to be converted into cross-linked polymers, or as starting materials for the preparation of epoxide compounds.

U.S. Pat. No. 4,614,761 to Takiama, et al. pertains to a process for producing a curable resin having unsaturated groups and side chains through urethane linkages. The resin is produced by reacting a polymer having hydroxyl groups in the side chains with an unsaturated monoiosocyanate. The monoisocyanate is obtained by reacting one mole of diisocyanate with one mole of an unsaturated monoalcohol. The polymer having side chain hydroxyl groups can be produced by copolymerizing a final monomer having hydroxyl groups and another vinyl monomer. Allyl alcohol is specifically disclosed as undesirable as the material for synthesizing the polymer because it does not serve to increase the molecular weight of the polymer.

U.S. Pat. No. 5,236,978 discloses a polymerizable organic resin of a polyol (allyl carbonate) and an aliphatic polyurethane having terminal allylic unsaturation. The resulting polymer has low yellowness and can be used to prepare photochromic articles such as lenses.

The foregoing allyl functional resins are generally high molecular weight and high viscosity, which limit their applications and physical properties. Accordingly, there is a need to develop new allyl functional resins with low molecular weight and viscosity which will exhibit higher mobility and better surface cure. Such would be especially useful in coatings, adhesives and sealants. Furthermore, there is a continuing need to develop new resins which will possess different properties from those previously developed. Such new resins, while generally useful as coating compositions, will find applications for which they are specifically suited depending on the specific properties of the resin.

SUMMARY OF THE INVENTION

A new class of curable allyl functional urethanes have now been developed. These urethanes are free radical-curable oligomer compositions having the following formula: $R_1[NHCO(OR)_y(OCH_2CH=CH_2)_m]_n$ wherein y is 0 or 1, n is an integer between 2 and 20, m is an integer between 1 and 5, R is a $C_1$–$C_{10}$ alkyl, arylalkyl, alkenyl, aryl, alkynyl, ($C_3$–$C_{10}$)cycloalkyl, ($C_3$–$C_{10}$)cycloalkenyl or alkoxy, and $R_1$ is one of aryl, arylalkyl, ($C_3$–$C_{10}$)cycloalkyl, ($C_3$–$C_{10}$)cycloalkenyl or heterocyclic. Also set forth is a method for making a cured resin comprising reacting the oligomer compositions with a free radical initiator to cause cross-linking of the resins.

DETAILED DESCRIPTION OF THE INVENTION

The present invention relates to a new class of allyl functional urethanes and processes for their preparation and use. The new resin compositions are prepared by the reaction of hydroxyl-containing allyl functional materials with aliphatic, aromatic, or cycloaliphatic isocyanates. The new compositions are soluble in typical aliphatic and aromatic solvents and are curable using free radical-based initiators. The compositions are also compatible with typical polymerized monomers and polymers such as unsaturated polyesters.

The resins of the present invention are prepared through the reaction of hydroxyl-containing allyl materials with aliphatic or aromatic isocyanates. Preferably, the aliphatic or aromatic isocyanates include two or more isocyanate groups per molecule. As used herein, the term "aliphatic" refers to alkyl, alkenyl, alkynyl, cycloalkyl and cycloalkenyl groups, any of which may be substituted with up to three halogen atoms. The term "heterocyclic" means an aryl group with one hetero-atom selected from O, N, and S. Examples of isocyanates which are suitable for use in the present invention include isophorone diisocyanate, toluene diisocyanate, 4,4'-dicyclohexylmethane diisocyanate, hexamethylene diisocyanate, 4,4'-methylene bis (phenyl isocyanate). Suitable isocyanates may also be dimers, trimers, and polymers. Specifically, Desmodur™ N 100 and N 3200 (aliphatic polyisocyanate resins based on hexamethylene diisocyanate (HDI)), Desmodur™ 3300 (a polyfunctional aliphatic isocyanate resin based on HDI) and Desmodur™ N 3400 (a polyfunctional aliphatic polyisocyanate resin based on HDI) all from Bayer Corp. are useful as isocyanates in the present invention. Desmodur is a trademark of Bayer Corporation of Pittsburgh, Pa., U.S.A.

The hydroxyl-containing allyl functional materials can be monoallylethers or polyallylethers. These allyl functional materials may be substituted with alkyl groups, halogens, or other conservative substituents. However, substitutions must be well thought out. Hydroxyl groups can be substituents only to the extent that reactivity with the isocyanate component is desired, and increasing the number of hydroxyl groups will change the proportions of allyl and isocyanate materials. Similarly, halogen substituents may be used. However, one method for making the hydroxyl containing allyl functional material used in the present invention is by reaction of an allyl halide and an alcohol. Using a halo-substituted allyl halide and alcohol would likely lead to undesirable products.

Examples of hydroxyl containing allylethers useful in the present invention include allylalcohol, allylalcohol propoxyllates, allyl alcohol ethoxylates, trimethyl propane diallylether, trimethylol propane monoallylether, glycerol diallylether, glycerol monoallylether, ethyleneglycol monoallylether, butanediol monoallylether, and hexanediol monoallylether. Many of the hydroxyl-containing allylethers useful in the present invention are readily available from chemical supply houses. Alternatively, the hydroxyl-containing allylethers can be prepared from the reaction of an alcohol with an allylhalide in the presence of a base. Conversely, they can be prepared from allylalcohol and organohalides in the presence of base. Both of these reaction schemes are well known, as are the end product allylethers.

The condensation reaction between the isocyanate and allylether hydroxy compounds, can be carried out with or without a catalyst. Catalyzed reactions are desirable due to shortened reaction time and fewer by-products, which results in simplified purification. The typical catalysts which may be used for this reaction are amines and tin-based catalysts. Specifically, catalysts useful in the present invention include dibutyltin dilaurate, 1,4-diazabicyclo [2.2.2]-octane (DABCO), 1,8-diazabicyclo-[5.4.0]-undec-7-ene (DBU), N,N-dimethylcyclohexylamine (DMCA), tetramethyltin, tetrabutyltin, tetraoctyltin, tributyltin chloride, dibutyltin dichloride, dimethyl tin oxide, trimethyltin chloride, dimethyltin dichloride, trioctyltin chloride, dibutyltin oxide, dibutyltin diacetate, butyltin trichloride, dioctyltin dichloride, dioctyltin oxide, dioctyltin dilaurate, and dioctyltin diacetate. Zinc, iron, bismuth, and zirconium complexes similar to those tin based complexes set forth above would also be useful as catalysts for the condensation reaction of the present invention. In the condensation reaction, it is desirable to use between 0.5 and 2.0, preferably between 0.75 and 1.5, more preferably between 0.9 and 1.1 equivalents of isocyanate for each equivalent of hydroxyl. In this manner, it is assured that there are few free alcohols or free isocyanates remaining in the material.

The final, condensed product will contain allyl functional groups. Generally, there will be at least several allyl groups on each molecule, and possibly many such groups. Preferably, there be at least two allyl functional groups per molecule to create adequate cross linking of the resin.

Once the resin is produced in this manner, cross linking can be accomplished by mixing the resin with a free radical type initiator such as a peroxide. The resin can also be air dried, since this will initiate polymerization, although the rate and consistency will be uncontrolled. The resulting condensation product will be of the general formula $R_1$-$[NHCO(OR)_y(OCH_2CH=CH_2)_m]_n$ where $R_1$ is the residue of the isocyanate-containing organic starting material, y is 0 or 1, and R is the organic residue of the hydroxyl-containing allyl ether starting material. The number n corresponds to the number of isocyanate groups per molecule starting material, and m is the number of allyl ether groups per molecule of starting material. It should be understood, however, that if the allyl-ether starting material includes a plurality of hydroxyl groups (as is preferred), R will have attachment to multiple $R_1$ groups, forming a network. R will bond to $R_1$ groups in the same number as the allyl ether starting material had hydroxyl groups. Furthermore, when m=n=2, R cannot be $(-CH_2)_3CCH_2CH_3$.

Where the hydroxyl containing allyl ether functional starting material has only one allyl ether group and one hydroxyl group the formula becomes $R_1[NHCO(OR)_yCH_2CH_2=CH_2]_n$ where y is 0 or 1. In the case of allyl alcohol, y=0. Any suitable free radical initiator should be acceptable, and will initiate cross-linking. The cross linking will occur between allyl groups. Thus the material is a free radical-curable composition (or air dryable composition) which produces a good surface cure due to the air dryable properties. Furthermore, the properties and extent of the cross linking in the final product can be controlled by controlling the number of isocyanates per molecule of starting material, and the number of hydroxyls per molecule of starting material. The system is very suitable for curing by means of UV curing, for which conventional UV irradiation sources and photoinitiators for example, benzoin derivates, peroxides, benzylketals and acetophenone derivates, may be employed.

Conventional additives such as, for example, pigments, fillers, flow agents and stabilizers can be added to the binder system. Examples of suitable pigments are inorganic pigments, such as titanium dioxide, zinc sulfide, iron oxide and chromium oxide, and organic pigments such as azo compounds. Examples of suitable fillers are metal oxides, silicates, carbonates and sulfates. The coating compositions may be used to coat substrates of any kind, such as wood, plastics, leather, paper, textiles, glass, ceramics, plaster, masonry, metals and concrete. They may be applied by standard methods, such as spray coating, spread coating, flood coating, casting, dip coating, roll coating. The coating compositions may be clear or pigmented lacquers. The present invention is further illustrated by the following examples.

Aliphatic Diallyl Urethane

Two moles of allyl alcohol were reacted with one mole of isophorone diisocyanate in the presence of a dibutyltin dilaurate catalyst. The reactions were in liquid form, and the reaction was carried out by combining the two reactants and holding the mixture at 90° C. for six hours. At that time, the reaction was completed, making a diallylurethane.

Aliphatic Tetraallyl Urethane

Following the procedure for Aliphatic diallyl urethane above, two moles of trimethylolpropane diallyl ether were reacted with two moles of isophorone diisocyanate and the resulting material was a tetraallyl urethane.

Applications for Improving Surface Cure

The resins from above were evaluated in two different coating formulations. The first was a two component ambient temperature cure concrete sealer. The second was a two-component low temperature bake metal coating

EXAMPLES 1 AND 2;

Concrete Sealer

TABLE 1

| | Formulation | | |
|---|---|---|---|
| | Comparative Example | Example 1 | Example 2 |
| Part A | | | |
| SR-210 poly(ethylene glycol) 200 diacrylate (From Sartomer Company, Inc., Exton, Pennsylvania, USA) | 40.00 | 40.00 | 40.00 |
| SR-350 trimethylol propane triacrylate (From Sartomer Company, Inc., Exton, Pennsylvania, USA) | 24.00 | 24.00 | 24.00 |
| Hydroxyethyl Methacrylate | 12.00 | 12.00 | 12.00 |
| Aliphatic Diallyl Urethane | — | 20.00 | — |
| Aliphatic Tetraallyl Urethane | — | — | 20.00 |
| 6% Cobalt Octoate | 1.00 | 1.00 | 1.00 |
| Silane Adhesion Promoter | 1.00 | 1.00 | 1.00 |
| Part B | | | |
| Cumene Hydroperoxide | 2.00 | 2.00 | 2.00 |

All figures are in parts by weight.

The components of Part A were mixed together by hand until homogeneous. The resulting material was mixed with Part B by hand for 1 minute. The viscosity of the mixed, uncured resin was measured using a Brookfield RVT Viscometer at 25° C. with #4 spindle at 100 rpm. Tack-free cure times were measured by casting a 15 mil thick film on an aluminum panel by the wire wound rod draw down method, and determining the time to cure tack-free as measured by touching a gloved fingertip without getting sticking.

TABLE II

Results, Concrete Sealer

| Performance Property | Comparative Example | Example 1 | Example 2 |
|---|---|---|---|
| Viscosity @ 23° C. (cps) - uncured resin | 30.0 | 85.0 | 50.0 |
| Tack-Free Cure Time, 15 mils (hrs) | >24.0 | 18.0 | 10.0 |

EXAMPLES 3 AND 4

Metal Coating

TABLE III

| | Formulation | | |
|---|---|---|---|
| | Comparative Example | Example 3 | Example 4 |
| Part A | | | |
| CN962 Aliphatic Difunctional Urethane Acrylate (from Sartomer Company, Exton, Pennsylvania, USA) | 30.0 | 30.0 | 30.0 |
| CN968 Aliphatic Hexafunctional Urethane Acrylate (from Sartomer Company, Exton, Pennsylvania, USA) | 20.0 | 20.0 | 20.0 |
| SR-9003 Propoxylated Neopentyl Glycol Diacrylate (from Sartomer Company, Exton, Pennsylvania, USA) | 20.0 | 20.0 | 20.0 |
| CD-513 PO Propoxylated Allyl Methacrylate (from Sartomer Company, Exton, Pennsylvania, USA) | 10.0 | 10.0 | 10.0 |
| Aliphatic diallyl urethane | — | 20.0 | — |
| Aliphatic tetrallyl urethane | — | — | 20.0 |
| 6% Cobalt Napthenate | 0.1 | 0.1 | 0.1 |
| Part B | | | |
| Cumene Hydroperoxide | 1.0 | 1.0 | 1.0 |

All figures are in parts by weight.

The SR-9003, CD-513. and urethane monomers of part A were blended together by hand until homogeneous. The CN962 and CN968 were warmed to 60° C. in a forced air oven and then added to the monomer mixture using a high shear mixer. The cobalt accelerator was then added to Part A and mixed until homogeneous. Finally the peroxide initiator (Part B) was added to Part A and mixed by hand until homogeneous.

Viscosity of the uncured mixture was measured by using a Brookfield RVT Viscometer at 23° C. using thermosel and #21 spindle. Shore D hardness was determined by casting 20 grams of formulation into an aluminum weighing dish, curing @100° C. for 30 minutes, and measuring the hardness of the resulting material using a Shore D durometer. Tack-Free Cure Time was measured by preparing 15 mil films by the wire wound rod draw down method and determining surface cure by touching with a gloved fingertip without sticking.

TABLE IV

Results

| Performance Property | Comparative Example | Example 3 | Example 4 |
|---|---|---|---|
| Viscosity @ 23° C. (cps) | 350 | 925 | 987 |
| Shore D Hardness | 76 | 66 | 68 |
| Tack-Free Cure (30 minutes @ 100° C.) | uncured | cured | cured |

As can be seen from Tables II and IV, both the concrete sealer resin and the metal coating resin performed much better when the allyl urethane resin compositions of the present invention were incorporated. In the case of the concrete sealer, Table II shows that the tack free cure times were increased substantially (from greater than 24 hours to 18 or fewer hours) by the addition of only 20% of the resin of the present invention.

Similarly, in thirty minutes at 100° C., the metal coating compositions including resins of the present invention were tack-free (cured). Under the same conditions, for the same time period, the composition without the new resin remained uncured, as shown in Table IV.

What is claimed is:

1. A free-radical curable oligomer resin composition having the formula:

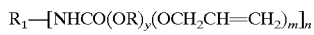

wherein n is an integer between 2 and 20, m is an integer between 1 and 5, y is 1, $R_1$ is selected from the group consisting of aryl, arylalkyl, $(C_3-C_{10})$ cycloalkyl, $(C_3-C_{10})$ cycloalkenyl and heterocyclic, and R is selected from the group consisting of $(C_1-C_{10})$ alkyl, aryl, $(C_1-C_{10})$ alkenyl, $(C_1-C_{10})$ alkynyl, $(C_3-C_{10})$ cycloalkyl, and $(C_3-C_{10})$ cycloalkenyl, providing that
(a) when m=n=2, R is not the moiety

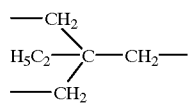

2. A method for making a cured resin comprising combining a curable resin of claim 1 with a free-radical initiator; and allowing said resin to cure.

3. The method of claim 2 further comprising the step of:

adding to said curable rein, a second acrylate resin, prior to adding said free-radical initiator.

4. The method of claim 3 wherein said free-radical initiator is a peroxide.

5. The method of claim 3 wherein n is an integer between 2 and 4, m is an integer between 1 and 3, $R_1$ is aryl, and R is selected from the group consisting of $(C_1-C_{10})$alkyl and $(C_1-C_{10})$alkenyl.

6. The method of claim 3 wherein n is 2, m is 2, y is 1, $R_1$ is aryl, and R is $(C_1-C_{10})$alkyl.

7. The cured resin produced by the process of claim 3.

8. The cured resin produced by the process of claim 6.

* * * * *